No. 693,379. Patented Feb. 18, 1902.
G. R. C. DAVIS.
BICYCLE COUPLING.
(Application filed Aug. 8, 1900.)

(No Model.)

Witnesses
Bayard C. Ryder
J. B. Stearns

Inventor
George R. C. Davis
By his Attorney

UNITED STATES PATENT OFFICE.

GEORGE R. C. DAVIS, OF MANCHESTER, NEW HAMPSHIRE, ASSIGNOR OF ONE-HALF TO JOHN CHAMPOUX, OF MANCHESTER, NEW HAMPSHIRE.

BICYCLE-COUPLING.

SPECIFICATION forming part of Letters Patent No. 693,379, dated February 18, 1902.

Application filed August 8, 1900. Serial No. 26,230. (No model.)

*To all whom it may concern:*

Be it known that I, GEORGE R. C. DAVIS, a citizen of the United States, residing at Manchester, in the county of Hillsboro and State of New Hampshire, have invented certain new and useful Improvements in Bicycle-Couplings; and I do hereby declare the following to be a full, clear, and exact description of the invention, such as will enable others skilled in the art to which it appertains to make and use the same.

This invention relates to devices for coupling together two single bicycles. This, in a broad sense, is not new, as various contrivances have been arranged whereby two single bicycles may be coupled together when disposed side by side.

So-called "bicycle-couplings," as far as I am aware, have heretofore formed a rigid connection for two bicycles when placed side by side, while my improved device forms a flexible connection for a pair of bicycles disposed one forward of the other, each requiring to be steered independently, but maintaining them practically equidistant one ahead of the other, my improved coupling being only sufficiently yielding longitudinally to avoid any unpleasant communication of sudden jars from one to the other, whereby their riders can more easily converse and obtain all the advantages of a tandem bicycle, the object of my invention being to provide a flexible connection for two bicycles in a simple economical manner and which shall be readily detachable, whereby two riders may be quite near together without any danger of colliding.

The invention consists in a flexible detachable connection between the "perch-tube" of one bicycle and the "head" of the other while said bicycles are running tandem.

In many instances a man and wife would like a tandem bicycle, but own single wheels and cannot afford to purchase a tandem; but by the use of my invention they can connect their single bicycles one forward of the other and enjoy many of the advantages of a tandem at slight expense, as will be fully set forth in the following specification and claims and clearly illustrated in drawings accompanying and forming a part of the same, of which—

Figure 1:
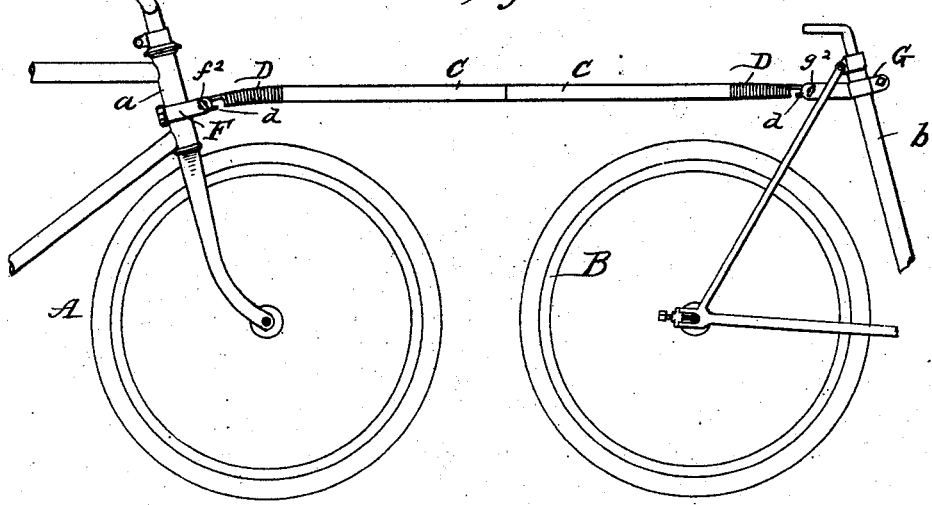
Figure 2:
Figure 3:
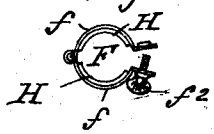
Figure 5:
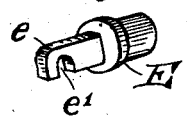
Figure 4:
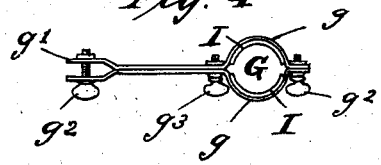

Figure 1 is a broken elevation showing portions of a pair of bicycles to which my improved coupling is attached. Fig. 2 is an enlarged detailed elevation of one of my improved coupling-bars as when made in two sections, the clamps or couplings for attachment to the bicycles being shown in dotted lines. Figs. 3 and 4 represent the couplings or clamps in plan view, Fig. 5 being a detail in perspective.

Similar reference-letters designate corresponding parts in all the views.

A B are bicycles, the head $a$ of the former being connected to the perch $b$ of the latter by my improved flexible coupling, the straight bar of which for convenience in packing or carrying may be formed in two sections C C and its adjacent ends quickly and firmly joined together by means of a threaded plug $c$. To the outer ends of said sectional bar are rigidly attached short flexible extensions D, formed of helically-bent wire, to the free end of each of which may be rigidly secured a connection E, having a flat extension $e$, which must be either perforated or provided with a slot $e'$ for attaching the clamps F G, by which the coupling-bar C is connected to the bicycles, the construction shown embracing the slot $e'$ being preferable on account of affording the more easy means for connection and disconnection, or hooks $d$ may be formed integral with the parts D, as in Figs. 1 and 2.

The clamps F G are similar in construction, varying only in their length and the addition of a clamping-screw to that clamp which attaches to the forward bicycle, which requires to be longer than the other, as it must reach through the backstays for connection to the perch $b$.

The clamp F comprises two steel plates, which are bent at $f$ and hinged together, so as to clasp a tube of a bicycle, and are provided with ends $f'$, projecting parallel and perforated for the reception of a clamping-bolt, or the perforations of one plate may be threaded and both plates be clamped together by a thumb-screw, as shown. The clamp G being necessarily longer than the clamp F, the thumb-screw $g^3$ will be required in addition to the screws $g^2$, which pass through the flat parallel portions $g'$, as shown best in Fig. 4, in order that the curved portions $g$ may be made to tightly clasp the tubes of a bicycle.

In practice one pair of the flat ends $f'$ $g'$ of the clamps F G may be tightly clasped upon the flat extension $e$ of one of the connections E by means of a screw $f^2$ or $g^2$, which passes through the slot $e'$ of said connections E, the slot being preferable to a perforation, for by the use of the former the screws $f^2$ $g^2$ have only to be loosened in order to withdraw the connections E from the clamps F G.

Suitable bushing H I, formed of felt or other soft material, may be secured to the inner surfaces of the bent portions $f$ $g$ of the clamps F G and avoid defacing the tubes of a bicycle.

Having described my invention, what I claim is—

1. As a means of coupling two bicycles one forward of the other, a bar or tube provided at its ends with extensions formed of helically-bent spring-wire, suitable hooks rigidly attached or formed integral one at the free end of each helical extension, and bands adapted for attachment one to each bicycle and having each a socket to which the hooked end of either helical extension may be firmly secured.

2. As a means of coupling two bicycles one forward of the other, a sectional bar or tube the adjacent ends of said sections being connected by a threaded plug, flexible extensions formed of helically-bent spring-wire and secured one to each outer end of said coupling-bar, a suitable hook formed integral with or rigidly attached to the free end of each helical extension, and a metal band adapted for attachment to each bicycle and provided with a socket to which the hook of either helical extension may be firmly attached.

In testimony whereof I affix my signature in presence of two witnesses.

GEORGE R. C. DAVIS.

Witnesses:
J. B. THURSTON,
EMILE H. TARDIVEL.